(12) United States Patent
Manning et al.

(10) Patent No.: US 12,344,069 B2
(45) Date of Patent: Jul. 1, 2025

(54) THERMAL MANAGEMENT SYSTEM FOR A VEHICLE

(71) Applicant: Robert Bosch GmbH, Stuttgart (DE)

(72) Inventors: Michael Manning, Cambridge, MA (US); Dana Niegorski, Burlington, MA (US)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 17/867,818

(22) Filed: Jul. 19, 2022

(65) Prior Publication Data

US 2023/0038912 A1    Feb. 9, 2023

Related U.S. Application Data

(60) Provisional application No. 63/230,352, filed on Aug. 6, 2021.

(51) Int. Cl.
*B60H 1/00* (2006.01)

(52) U.S. Cl.
CPC ..... *B60H 1/00278* (2013.01); *B60H 1/00385* (2013.01); *B60H 1/00885* (2013.01); *B60H 2001/00307* (2013.01); *B60H 2001/00928* (2013.01)

(58) Field of Classification Search
CPC ............ B60H 1/00278; B60H 1/00385; B60H 1/00885; B60H 2001/00307; B60H 2001/00928; B60H 1/323
USPC .......................................................... 165/42
See application file for complete search history.

(56) References Cited

U.S. PATENT DOCUMENTS

| | | | | |
|---|---|---|---|---|
| 2002/0184908 A1* | 12/2002 | Brotz | ...................... | B60H 1/143 62/198 |
| 2009/0283604 A1* | 11/2009 | Martinchick | .......... | B60H 1/034 237/12.3 B |
| 2010/0012295 A1* | 1/2010 | Nemesh | ............ | H01M 10/6568 165/104.19 |
| 2010/0025006 A1* | 2/2010 | Zhou | .................. | B60H 1/00278 165/59 |
| 2011/0296855 A1* | 12/2011 | Johnston | ................. | B60L 50/40 62/160 |
| 2012/0297809 A1* | 11/2012 | Carpenter | ............... | B60L 58/26 62/239 |
| 2013/0175022 A1* | 7/2013 | King | ....................... | B60L 50/62 237/12.3 B |

(Continued)

FOREIGN PATENT DOCUMENTS

| | | |
|---|---|---|
| DE | 102015218825 | 3/2017 |
| DE | 102019207993 | 12/2019 |
| DE | 112018006384 | 8/2020 |

*Primary Examiner* — Steve S Tanenbaum
(74) *Attorney, Agent, or Firm* — Kelly McGlashen; Maginot, Moore & Beck LLP

(57) ABSTRACT

A thermal management system is provided for a vehicle that includes a traction battery. The thermal management system includes refrigerant and cooling subsystems. The cooling subsystem includes a cabin coolant loop that provides thermal management of a passenger cabin of the vehicle, a battery coolant loop that provides thermal management of the traction battery and a drivetrain coolant loop that provides thermal management of a drivetrain and power electronics of the vehicle. The cabin, battery and the drivetrain coolant loops are interconnected via coolant proportional valves and fluid lines.

7 Claims, 11 Drawing Sheets

(56) References Cited

U.S. PATENT DOCUMENTS

| | | |
|---|---|---|
| 2019/0176572 A1 | 6/2019 | Kim |
| 2020/0108690 A1* | 4/2020 | Tan .................... B60H 1/00921 |
| 2022/0349627 A1 | 11/2022 | Lee et al. |

* cited by examiner

THERMAL MANAGEMENT SYSTEM FOR A VEHICLE

BACKGROUND

Vehicles such as battery-electric vehicles (BEVs), plug-in hybrid electric vehicles (PHEVs) and strong hybrid-electric vehicles (SHEVs) contain a traction battery assembly to act as an energy source for the vehicle. The traction battery assembly includes components and systems to assist in managing vehicle performance and operations. The traction battery assembly also includes high voltage components. However, vehicles designed to be driven partially or fully electrically may lack the availability of sufficient waste heat from an internal combustion engine to provide cabin heating, thus requiring additional thermal system functionality.

It is desirable to provide a thermal management system that reliably and efficiently controls the temperature of various vehicle components and/or subsystems to provide a comfortable user operating experience, to allow optimal vehicle performance and to provide a reliable and durable vehicle.

SUMMARY

In some aspects, a hybrid or electric vehicle is equipped with a thermal management system that controls the temperature of the vehicle cabin and one or more vehicle components and/or subsystems such as the high voltage traction battery, battery management system, powertrain, vehicle controller and power electronics, etc.

In some aspects, a liquid and refrigerant thermal management system for a vehicle is configured to transfer heat between ambient air, a drivetrain or drivetrains, a battery, and cabin air. The thermal management system may include a coolant subsystem and a refrigerant subsystem. The coolant subsystem thermal management functions and configurations include:

- Proportional radiator bypass to regulate the drivetrain coolant loop temperature
- Proportional valve modes to transfer heat from the drivetrain to other components
- Heat rejection through a heat exchanger upstream of the traction battery
- Heat rejection through a heat exchanger as part of the cabin HVAC system.
- Heat addition by a an electrical resistance heater, commonly referred to as a positive temperature coefficient heater (PTC)
- Heat addition by a liquid cooled condenser (LCC)
- Proportional valve modes to regulate heat exchange between the cabin and battery coolant loops
- Passive connection of cabin and battery coolant loops for conservation of mass/flow-balancing
- The LCC (a heat exchanger in a cabin coolant loop) and PTC (resistive heater in the cabin coolant loop) are in series allows for both components to simultaneously contribute heat to the circuit.

The coolant subsystem employs one or more proportional valves to selectively combine a vehicle drivetrain coolant loop that provides heating and/or cooling to the vehicle drivetrain, a battery coolant loop that provides heating and/or cooling to the vehicle traction battery, and a cabin coolant loop that provides heating and/or cooling to the vehicle cabin. The proportional valves, used in combination with the LCC and the PTC, allow the system to bring heat simultaneously to the cabin and battery loops.

The refrigerant subsystem thermal management functions and configurations include:

- Heat rejection by a liquid cooled condenser (LCC)
- Heat rejection or addition by a heat exchanger ("Front HX") depending on ambient conditions
- Heat addition through a heat exchanger connected to battery coolant loop
- Heat removal through a heat exchanger ("evap") as part of cabin HVAC system for cabin air conditioning In the thermal management system, the connections between the cabin, battery, and drivetrain coolant loops are made using proportional valves. Use of proportional valves in the thermal management system is advantageous because a proportional valve provides a change in output pressure or flow in the same ratio as the change in the input, for example if the input flowrate doubles then the output flowrate will also double. In addition, an input to the proportional valve can be connected to one or more outputs of the valve, and multiple inputs can be combined into a single output.

In some embodiments, the thermal management system may include a 5-port coolant proportional valve (CPV) and a 3-port CPV, coolant tee junctions, and multiple refrigerant interfaces, which enable many possible operating modes. Although example modes are shown to illustrate range of functions, the shown modes are illustrative and not exhaustive.

In some embodiments, the 5-port CPV and the 3-port CPV may be combined into a single, higher functionality valve, for example an 8-port CPV.

In some embodiments, an integrated module is provided in which a subset of the elements used to control coolant and/or refrigerant flow in different vehicle systems may be incorporated into a single, integrated device referred to herein as a "flexible thermal unit" (FTU). An FTU allows thermal management of several sub-systems from a single device, reducing component packaging requirements, lowering costs and increasing vehicle efficiency. Since the FTU reduces packaging size and lowers cost, new functions and components can be added that increase function and system performance in a way that is viable for the cost-conscious automotive market.

DETAILED DESCRIPTION

Figure 1:
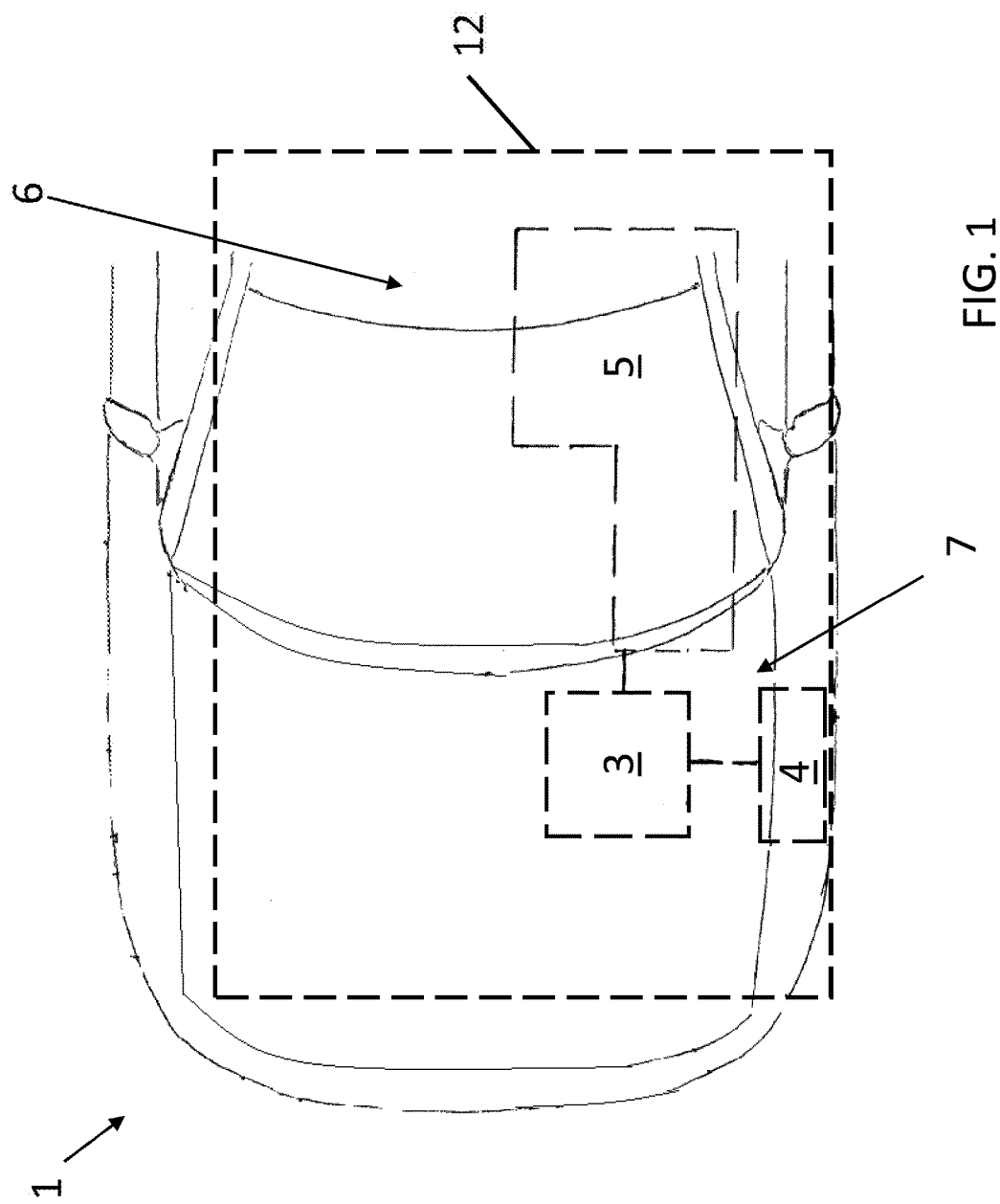
FIG. 1 is a schematic diagram of an electric vehicle including a thermal management system.

Referring to FIG. 1, an electric vehicle 1 includes a thermal management system 12. The electric vehicle 1 may be a battery-electric (i.e., all electric) vehicle (BEV), a plug-in hybrid electric vehicle (PHEV), or a hybrid electric vehicle (HEV). As such, the electric vehicle 1 includes at least one electric traction motor 3 for propulsion of the vehicle. For example, as shown in FIG. 1, the electric traction motor 3 can be mechanically coupled directly or indirectly to rotate one or more wheels 4 of the vehicle 1 (only one wheel 4 is shown). The electric vehicle 1 may in some constructions include a combustion engine. However, in partial- or full-electric driving modes, drive power requirements from the combustion engine are reduced or eliminated. In other constructions, the electric vehicle 1 has no combustion engine operable for propulsion of the vehicle. In order to power the electric traction motor 3, a traction battery 5 is included in the vehicle 1. The traction battery 5 may be a high voltage battery (e.g., greater than 100 Volts) and may require cooling or heating under certain circumstances. The traction motor 3, the wheels 4 and the associated controller and power electronics (not shown) are referred to herein as vehicle drivetrain 7. In addition, a cabin 6 of the vehicle 1 that houses vehicle occupants may be provided with climate control for occupant comfort.

Referring to FIG. 2, the thermal management system 12 includes a closed-loop refrigerant subsystem 20 and a closed-loop coolant subsystem 30. The refrigerant subsystem 20 provides a vapor-compression refrigeration cycle upon a working fluid, or "refrigerant". The refrigerant subsystem 20 facilitates thermal management of the vehicle drivetrain 7 via a condenser 24 that provides heat transfer to or from ambient space, and also interfaces with the coolant subsystem 30. The coolant subsystem 40 employs one or more proportional valves 44, 54 to selectively combine vehicle drivetrain thermal management via a vehicle drivetrain coolant loop 60, traction battery thermal management via a battery coolant loop 50 and cabin thermal management (e.g., climate control) via a cabin coolant loop 40. Operation of the thermal management system 12 depends upon vehicle operating conditions, ambient conditions, and climate control requirements of the cabin occupant(s). Features of the refrigerant and cooling subsystems 20, 30 of the thermal management system 12 will now be described in detail.

The refrigerant subsystem 20 includes compressor 21. In some embodiments, the compressor 21 may be an electronic compressor. The compressor 21 outputs hot refrigerant to a liquid cooled condenser (LCC) 22, which transfers some heat from the refrigerant to the cabin coolant loop 40. The LCC 22 outputs slightly cooled refrigerant to a first expansion valve 23. The first expansion valve 23 may be an electronic expansion valve (EEV) that can selectively be changed between an expansion mode in which fluid passing therethrough is expanded (cooled) and a fully-open mode in which fluid passing therethrough is unchanged. Unless otherwise indicated, the first EEV 23 is operated in the expansion mode. The first EEV 23 outputs a cold refrigerant, which is directed to a front heat exchanger 24 (i.e., a compressor) that is part of an engine cooling fan package 80. The engine cooling fan package 80 includes the front heat exchanger 24, a drive heat exchanger 64 (i.e., a radiator that is part of the drivetrain coolant loop 60) and an engine cooling fan 11 in a stacked arrangement that is typically located immediately behind the front grille (not shown) of a vehicle. The front heat exchanger 24 may transfer heat to the refrigerant, and thus outputs cool refrigerant to the compressor 21 via a shut-off valve (SOV) 25 and an accumulator 26. The compressor 21, the LCC 22, the first EEV 23, the front heat exchanger 24 and the accumulator 26 constitute a main refrigerant loop.

The refrigerant subsystem 20 can be controlled to redirect at least some refrigerant to other vehicle components, depending on the configuration of the respective components and the SOV 25. To this end, the refrigerant subsystem 20 includes a first sub-loop in which refrigerant from the front heat exchanger 24 is directed to a second electronic expansion valve 28 prior to passing through the refrigerant side of the battery heat exchanger 51, where it cools the coolant of the battery coolant loop 50 and is then directed to the accumulator 26 and compressor 21, thus returning to the main refrigerant loop. In addition, the refrigerant subsystem 20 includes a second sub-loop in which refrigerant from the front heat exchanger 24 is directed to a solenoid thermostatic expansion valve (TXV) 27. Cooled refrigerant exiting from the TXV 27 is directed to an evaporator 29 associated with a cabin heat exchanger 41 of the cabin coolant loop 40. A blower may draw air over both the evaporator 29 and the cabin heat exchanger 41 and into the cabin, bringing hot air in the case of a hot cabin heat exchanger 41 or cool air in the case of a relatively cold evaporator 29. Refrigerant exiting the evaporator 29 is directed to the accumulator 26 and the compressor 21, thus returning to the main refrigerant loop. Depending on the configuration of the respective components, refrigerant may flow through the first sub-loop and not the second, refrigerant may flow through the second sub-loop and not the first, or refrigerant may flow through both the first and second sub-loops.

The refrigerant used in the refrigerant subsystem 20 is a substance suitable for use in a heat cycle is capable of undergoing a phase change between gas and liquid to allow cooling. For example, in some embodiments, the refrigerant used in the refrigerant subsystem 20 is R1234YF.

The coolant subsystem 20 includes the vehicle drivetrain coolant loop 60, the battery coolant loop 50 and the cabin coolant loop 40 which are selectively combined via proportional valves 44, 54 as required by operating conditions.

The cabin coolant loop 40 includes a first pump 43 that drives coolant fluid through the coolant subsystem 30. Coolant exiting the first pump 43 enters the coolant side of the LCC 22. Heat may be transferred to the coolant within the LCC 22 so that the temperature of the coolant exiting the LCC 22 is greater than the temperature of the coolant exiting the first pump 43. The coolant exiting the LCC 22 is directed to the PTC 42, where additional heat may be added to the coolant. Thus, the temperature of the coolant exiting the PTC 42 is greater than the temperature of the coolant exiting the LCC 22. The LLC 22 and PTC 42 are in series, which allows for both components to simultaneously contribute heat to the cabin coolant loop 40. The cabin coolant loop 40 includes the cabin heat exchanger 41 that cooperates with the refrigerant cooled evaporator 29 and a blower to effect climate control of the vehicle cabin 6. For example, due to the relatively high temperature of the coolant flowing through the cabin heat exchanger 41, the temperature within the cabin 6 may be increased if desired by the vehicle occupants. As discussed previously, refrigerant exiting the evaporator 29 is directed to the accumulator 26 and the compressor 21, thus returning to the main refrigerant loop.

Coolant exiting the cabin heat exchanger 41 is directed to a port of a first fluid control valve. In the illustrated embodiment, the first fluid control valve is a three-port coolant proportional valve (CPV) 44 (FIG. 2B), and the coolant exiting the cabin heat exchanger 41 is directed to the first port 44(1) of the three-port CPV 44. The inlet of the first pump 43 is connected to the second port 44(2) of the three-port CPV 44, and the third port 44(3) of the three-port CPV 44 is connected to the battery coolant loop 50, and particularly to an inlet of coolant side of the battery heat exchanger 41.

The battery coolant loop 50 includes a battery heat exchanger 51. The refrigerant side of the battery heat exchanger 51 is part of the first sub-loop of the refrigerant subsystem 20. Coolant exiting the battery heat exchanger is directed to the battery 52, where it is used to cool individual electrochemical cells of the battery 52. Coolant exiting the battery 52 is directed to a port of a second fluid control valve. In the illustrated embodiment, the second fluid control valve is a five-port coolant proportional valve (CPV) 54 (FIG. 2C), and the coolant exiting the battery 52 is directed to the first port 54(1) of the five-port CPV 54. The battery coolant loop 50 includes a second pump 53, which is connected to a second port 54(2) of the five-port CPV 54. The second pump 53 drives coolant fluid through the coolant subsystem 30, and is connected to an inlet of the first pump 43. The second pump 53 is also connected to the outlet of the third port 44(3) of the three port CPV 44 via a bypass line 56.

The vehicle drivetrain coolant loop 60 includes a third pump 63 that is fed from a reservoir 65. The inlet of the third pump 63 is connected to the fifth port 54(5) of the five-port CPV 54. The outlet of the third pump 63 is connected to the vehicle power electronics 62, which may include, but is not limited to, a DC-DC converter and an on-board charger (OBC). Coolant exiting the power electronics 62 is directed to an e-axle 61. The e-axle 61 is a compact modular unit that includes the electric traction motor 3, electronics and the transmission that power the vehicle's axle. Depending on system requirements, the coolant exiting the e-axle 61 may be returned to the fourth port 54(4) of the 5-port CPV 54 via the drive heat exchanger 64 of the engine cooling package 80, or alternatively may be returned to the third port 54(3) of the 5-port CPV 54 while bypassing the drive heat exchanger 64.

The coolant used in the coolant subsystem 30 is a substance suitable for use in a vehicle cooling system. For example, in some embodiments, the coolant is water, ethylene glycol or a mixture of the two.

Figure 2A:
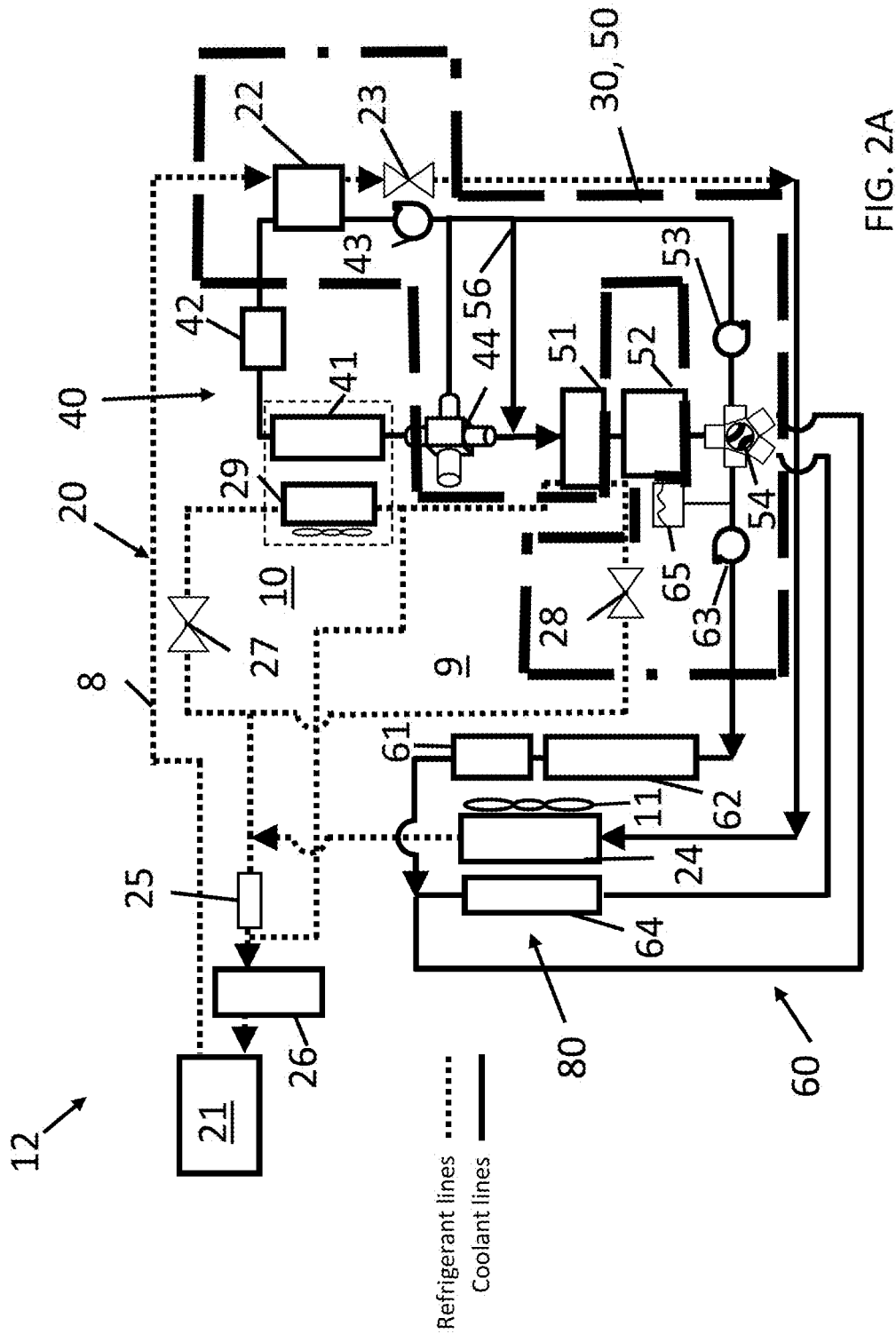
FIG. 2A is a schematic diagram of a thermal management system of an electric vehicle, in which broken lines are used to enclose a subset of the system elements that may be incorporated into an FTU.
Figures 2B, 2C:
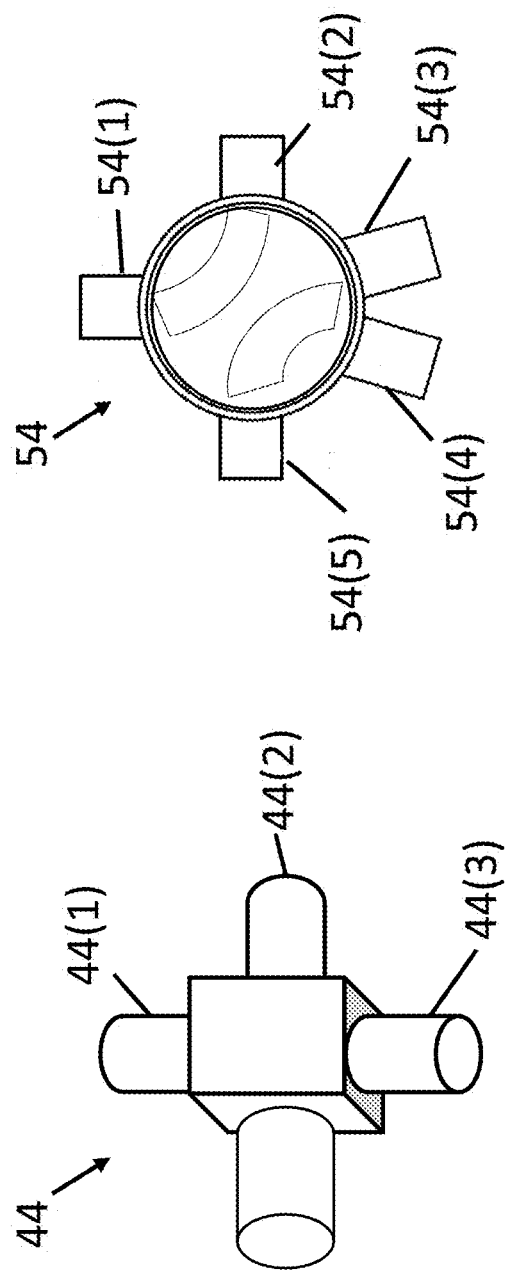
FIG. 2B is an enlarged version of the three-port coolant proportional valve of FIG. 2A.
FIG. 2C is an enlarged version of the five-port coolant proportional valve of FIG. 2A.

As can be seen in FIG. 2A, both the refrigerant and coolant subsystems 20, 30 are used to thermally regulate the climate of the vehicle cabin 6, the traction battery 52 and the drivetrain including the e axle 61. For example, the refrigerant subsystem 20 has component interfaces with the cabin coolant loop 40 (e.g., heat transfer to cabin from refrigerant), the battery coolant loop 50 (e.g., heat transfer from coolant to refrigerant), and the drivetrain coolant loop 60 (e.g., a condenser of the engine cooling fan package 80 exposed to an ambient temperature results in heat transfer to or from that ambient temperature).

Figure 3:
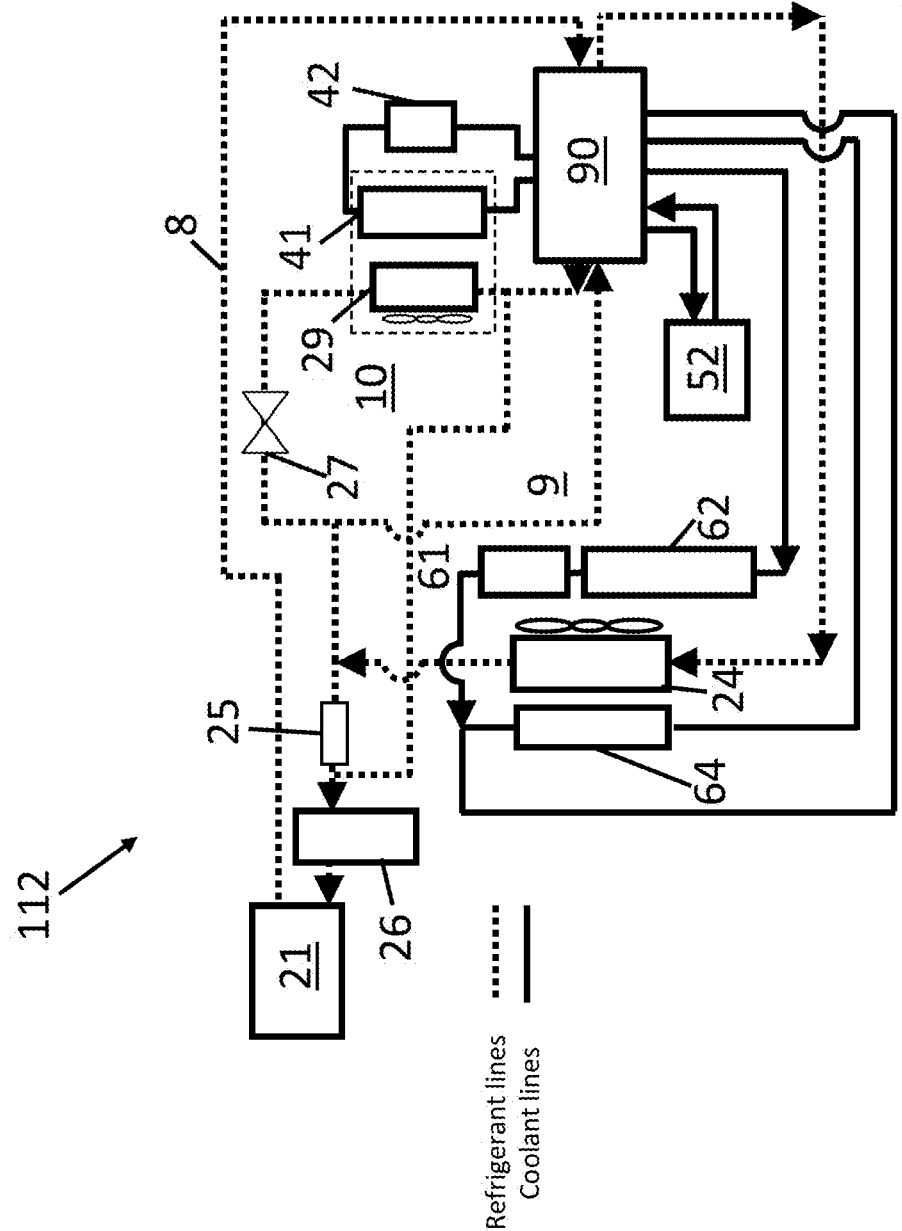
FIG. 3 is a schematic diagram of an alternative embodiment of the thermal management system including the FTU.

Referring to FIG. 3, in some embodiments, a thermal management system 112 may include an integrated cooling module in which a subset of the elements used to control coolant flow in different vehicle systems (e.g., the cabin coolant loop 40, the battery coolant loop 50 and the drivetrain coolant loop 60) may be incorporated into a single, integrated device referred to herein as a "flexible thermal unit" (FTU) 90. The elements that are included in the FTU 90 depend on the requirements of the specific application. In the illustrated embodiment, for example, the FTU 90 includes the first, second and third pumps 43, 53, 63, the LCC 22, the first and second EEV 23, 28, the three-port CPV 44, the five-port CPV 54, the battery heat exchanger 51 and the reservoir 65. By consolidating these elements into a single, integrated device, packaging size requirements of the elements and manufacturing costs are reduced.

Figure 4:
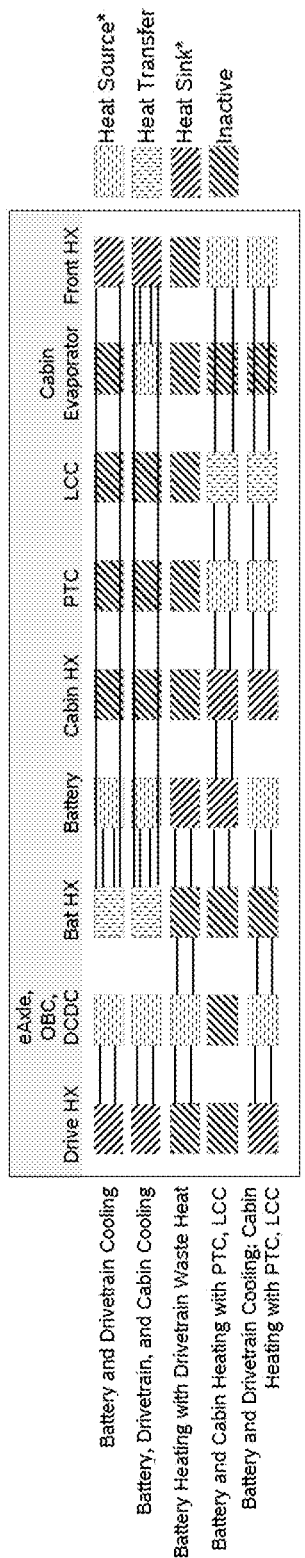
FIG. 4 is a table that defines exemplary operating modes of the thermal management system.

In the thermal management system 12, 112 the functionality of the three-port CPV 44 and the five-port CPV 54, coolant tee junctions, and multiple refrigerant interfaces enable many possible operating modes. FIG. 4 is a table that outlines system configurations corresponding to some of the possible operating modes. For modes that include waste heat, the PTC 42, and/or the LCC 22, these heat sources can be optionally active depending on whether the system has sufficient heat. For example, if the LCC 22 supplies enough heat to the cabin loop, the PTC 42 might not be activated. Thus, there are several possible permutations even within the available modes.

Some exemplary operating modes will now be described with respect to FIGS. 5-10. The exemplary operating modes described herein are shown to illustrate range of functions and are not exhaustive.

Figure 5:
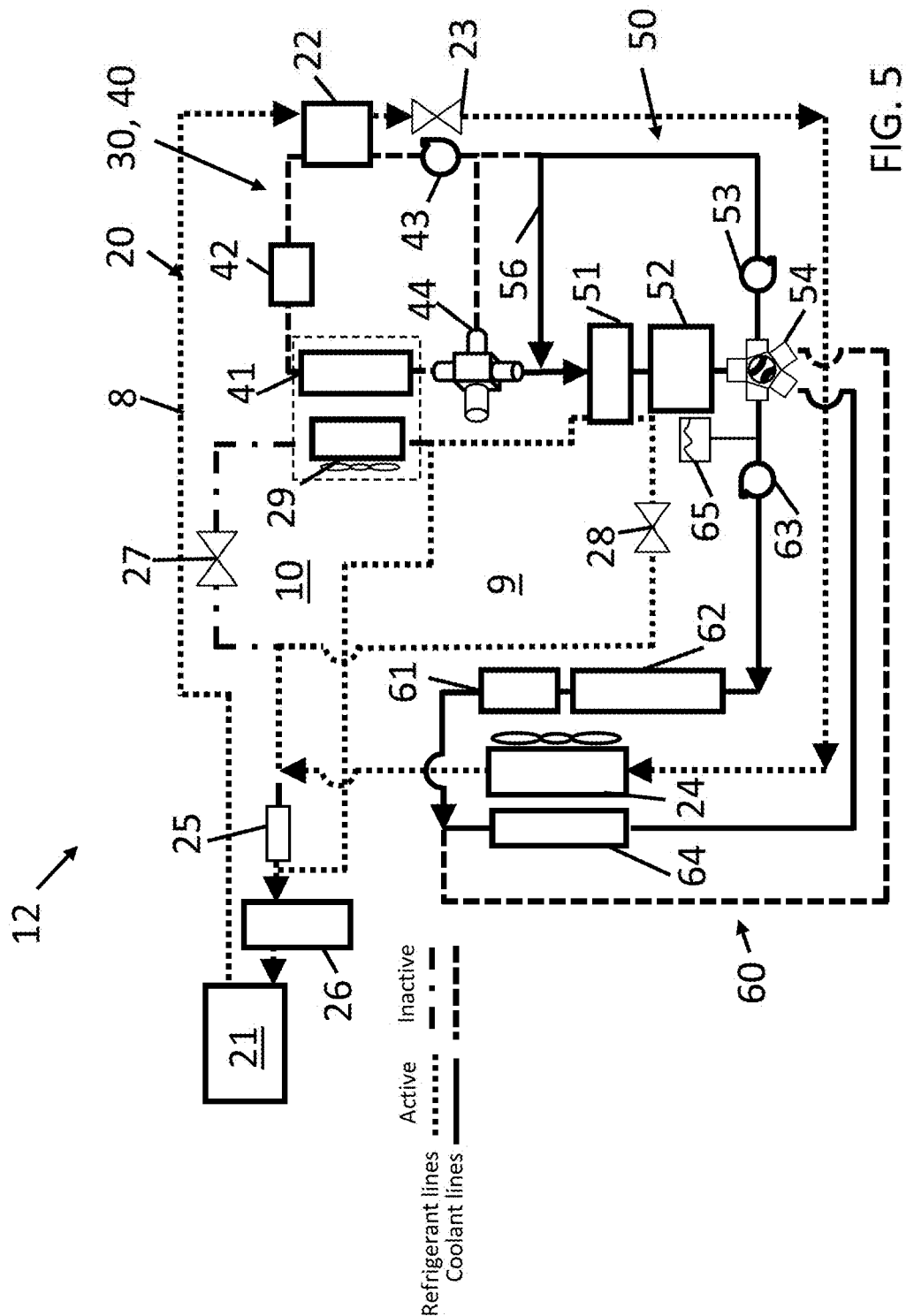
FIG. 5 is a schematic diagram of an exemplary operating mode of the thermal management system.

Referring to FIG. 5, in one exemplary operating mode, battery and drivetrain cooling is provided. In this mode, in the coolant subsystem 30, the cabin coolant loop 40 and the fluid line that connects the drive heat exchanger 64 and the third port 53(4) of the five-port CPV 54 are inactive. The cabin coolant loop 40 is substantially bypassed via a bypass line 56. In addition, in the refrigerant subsystem 20, the second refrigerant sub-loop 10 is inactive.

Figure 6:
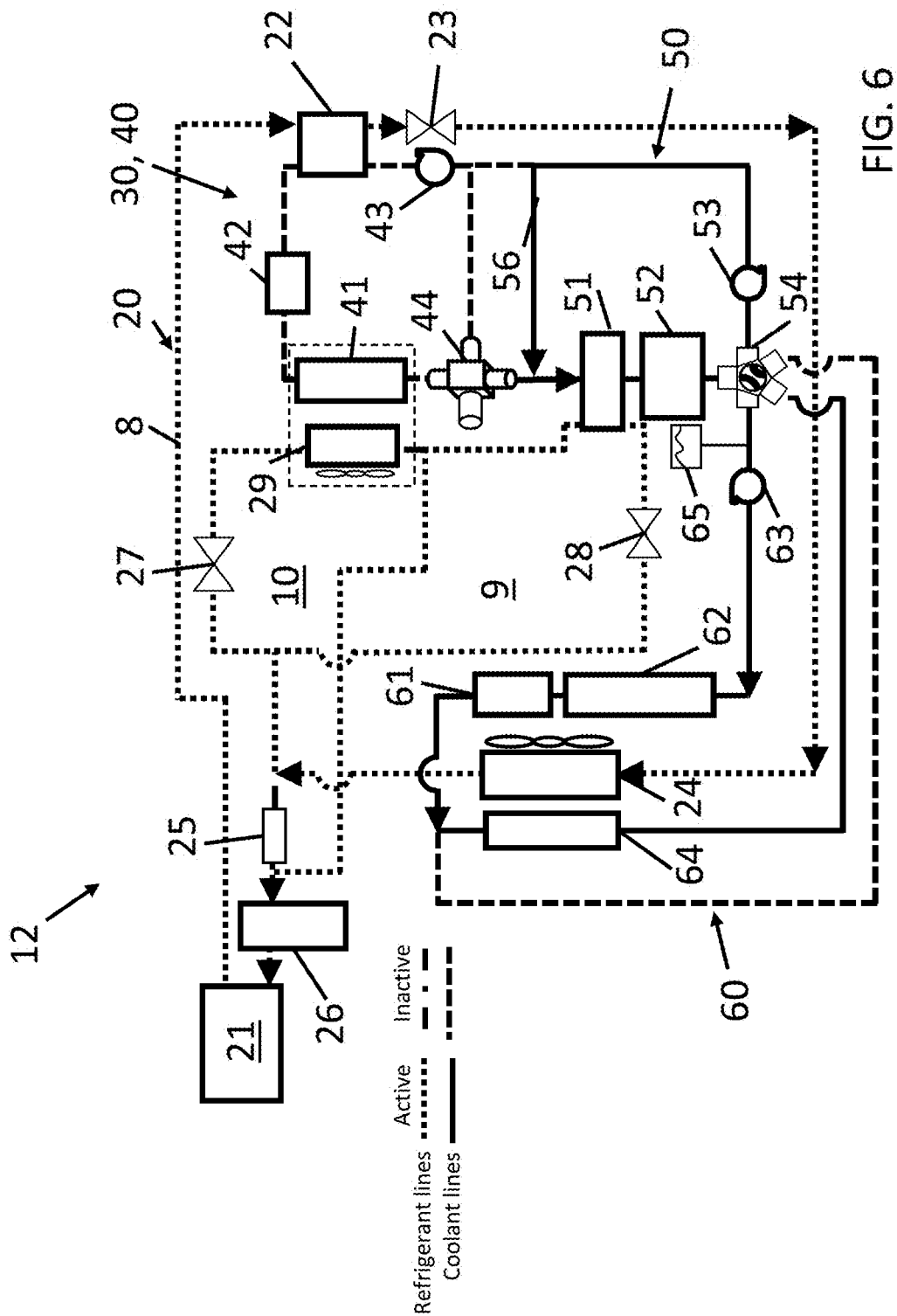
FIG. 6 is a schematic diagram of another exemplary operating mode of the thermal management system.

Referring to FIG. 6, in another exemplary operating mode, battery, drivetrain and cabin cooling is provided. In this mode, in the coolant subsystem 30, the cabin coolant loop 40 and the fluid line that connects the drive heat exchanger 64 and the third port 53(4) of the five-port CPV 54 are inactive. The cabin coolant loop 40 is substantially bypassed via the bypass line 56. In the refrigerant subsystem 20, the main loop and sub-loops are active.

Figure 7:
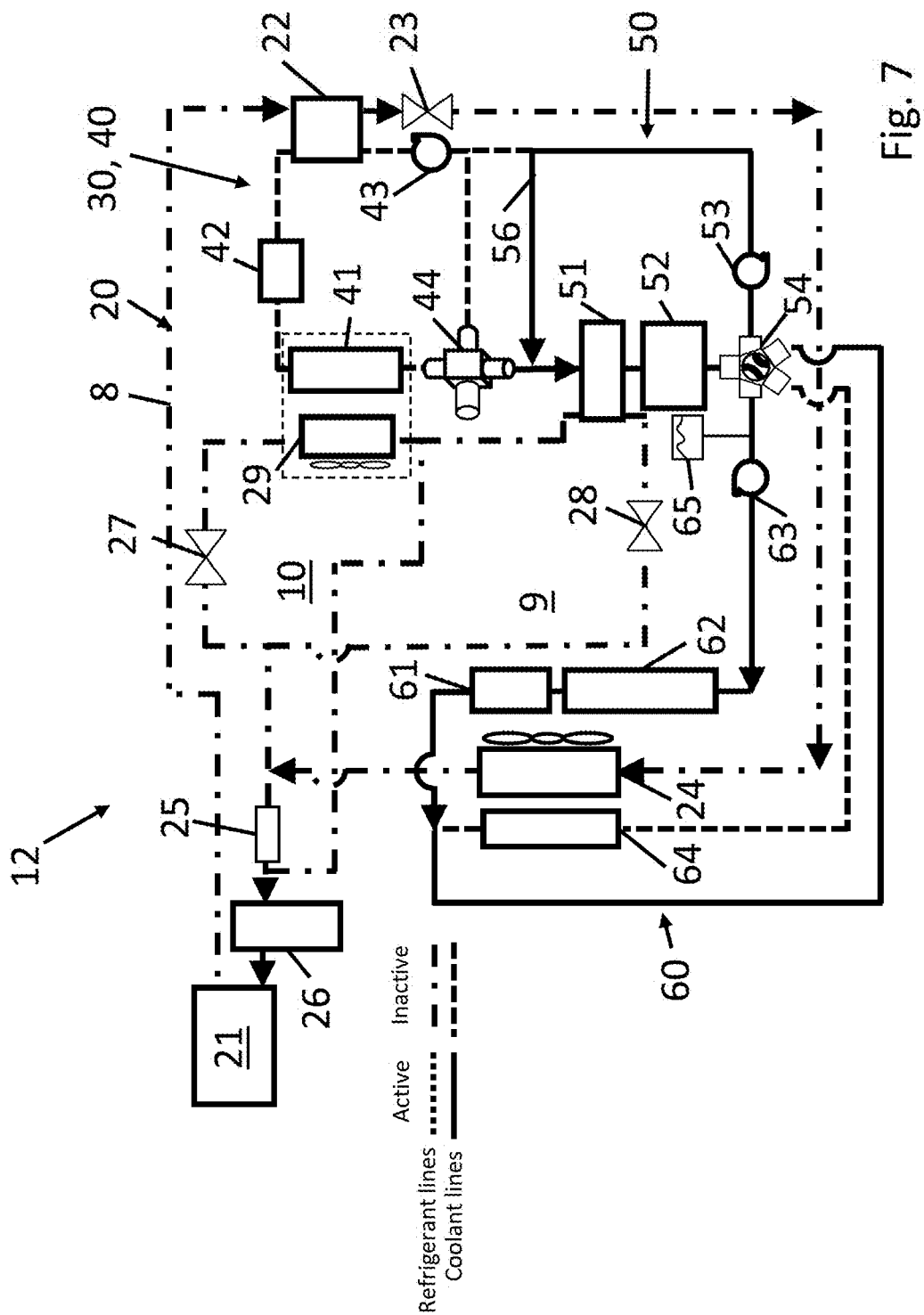
FIG. 7 is a schematic diagram of another exemplary operating mode of the thermal management system.

Referring to FIG. 7, in another exemplary operating mode, battery heating using drivetrain waste heat is provided. In this mode, in the coolant subsystem 30, the cabin coolant loop 40 is inactive, while coolant flows through the battery coolant loop 50 and the drivetrain coolant loop 60. In particular, coolant flows from the battery coolant loop 50 to the drivetrain coolant loop 60 via the first and fifth ports 54(1), 54(5) of the five-port CPV 54, and returns from the drivetrain coolant loop 60 to the battery coolant loop 50 via the third and second ports 54(3), 54(2) of the five-port CPV 54. In addition, in the refrigerant subsystem 20, the main refrigerant loop 8 and the first and second refrigerant sub-loops 9, 10 are inactive.

Figure 8:
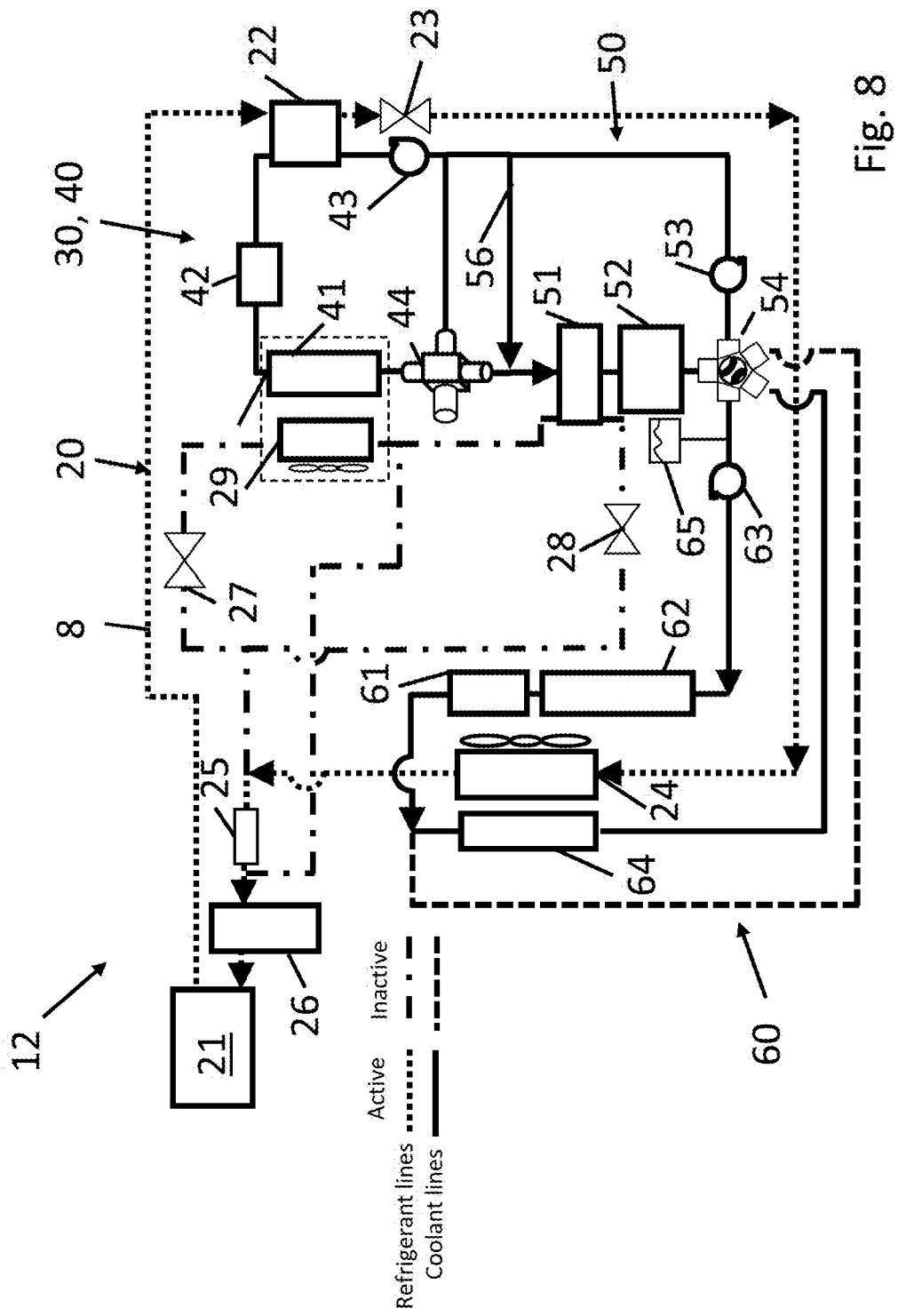
FIG. 8 is a schematic diagram of another exemplary operating mode of the thermal management system.

Referring to FIG. 8, in another exemplary operating mode, battery and cabin heating using the PTC 42 and the LCC 22 is provided. In this mode, in the coolant subsystem 30, the fluid line that connects the drive heat exchanger 64 and the third port 53(4) of the five-port CPV 54 is inactive. In this embodiment, the three-port CPV valve 44 remains partially open permitting some fluid flow between the cabin coolant loop 40 and the battery coolant loop 50. In addition, in the refrigerant subsystem 20, the first and second refrigerant sub-loops 9, 10 are inactive.

Figure 9:
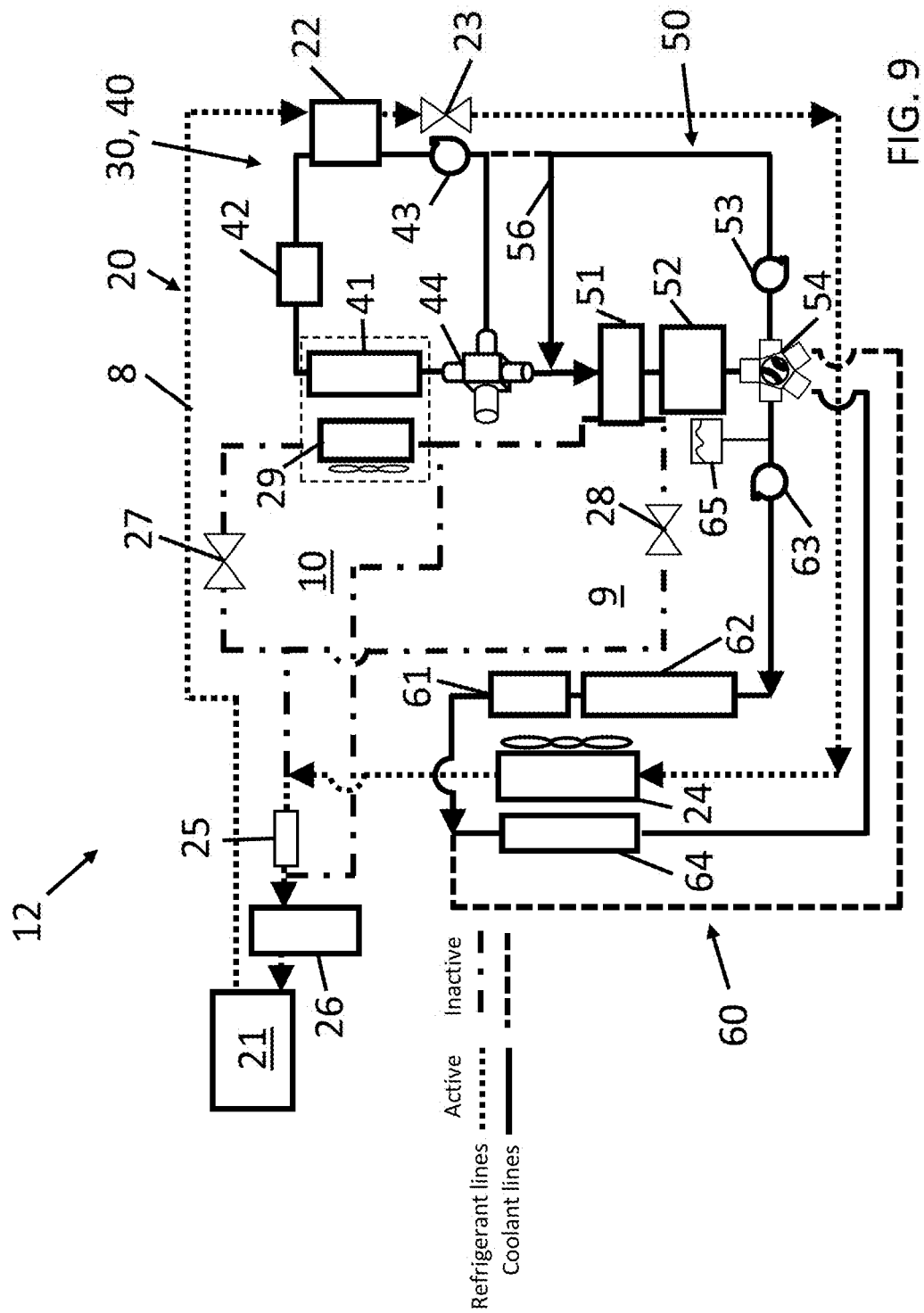
FIG. 9 is a schematic diagram of another exemplary operating mode of the thermal management system.

Referring to FIG. 9, in another exemplary operating mode, battery and drivetrain cooling along with cabin heating using the PTC 42 and LCC 22 is provided. In this mode, in the coolant subsystem 30, the fluid line that connects the drive heat exchanger 64 and the third port 53(4) of the five-port CPV 54 is inactive. In addition, in the refrigerant subsystem 20, the first and second refrigerant sub-loops 9, 10 are inactive.

Figure 10:
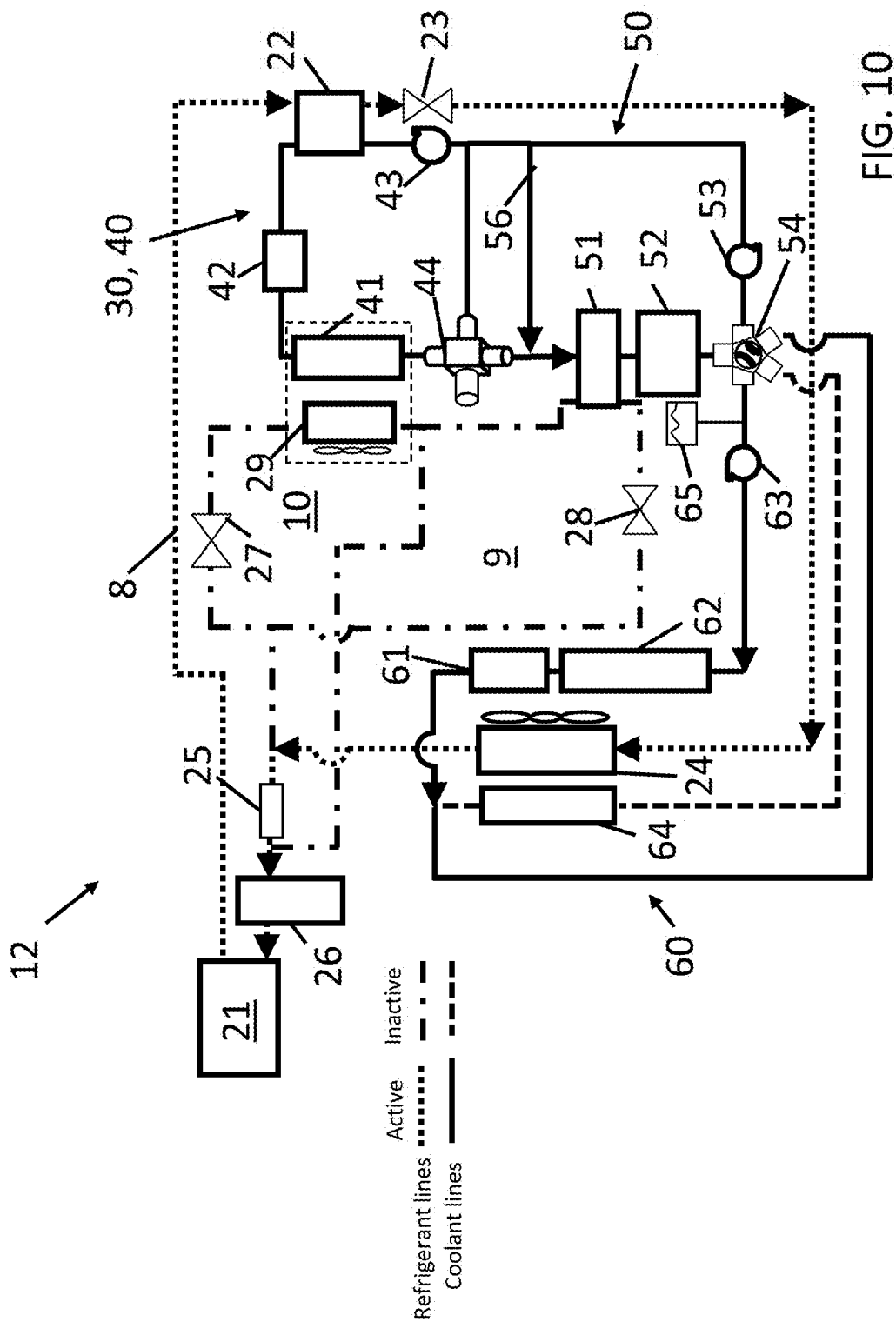
FIG. 10 is a schematic diagram of another exemplary operating mode of the thermal management system.

Referring to FIG. 10, in another exemplary operating mode, battery and cabin heating using the drivetrain waste heat, the PTC 42 and the LCC 22 is provided. In this mode, in the coolant subsystem 30, the fluid line that connects the drive heat exchanger 64 and the third port 53(4) of the five-port CPV 54 is inactive. In addition, in the refrigerant subsystem 20, the first and second refrigerant sub-loops 9, 10 are inactive. In this mode, proportional control of the 3-port and 5-port CPV 44, 54 allows for temperature control between the cabin coolant loop 40 and the battery coolant loop 50.

Selective illustrative embodiments of the thermal management system are described above in some detail. It should be understood that only structures considered necessary for clarifying the thermal management system have been described herein. Other conventional structures, and those of ancillary and auxiliary components of the thermal management system, are assumed to be known and understood by those skilled in the art. Moreover, while a working example of the thermal management system have been described above, the thermal management system is not limited to the working example described above, but various design alterations may be carried out without departing from the thermal management system as set forth in the claims.

We claim:

1. A thermal management system for a vehicle that includes a traction battery, the thermal management system comprising:
   a cabin coolant loop that provides thermal management of a passenger cabin of the vehicle;
   a battery coolant loop that provides thermal management of the traction battery; and
   a drivetrain coolant loop that provides thermal management of a drivetrain and power electronics of the vehicle, wherein
   the cabin coolant loop, the battery coolant loop and the drivetrain coolant loop are interconnected via fluid control valves and fluid lines, and
   a valve is used to divert coolant from the drivetrain coolant loop to both of the battery coolant loop and the cabin coolant loop, whereby waste heat from a drivetrain of the vehicle is used to thermally manage both the passenger cabin and the traction battery.

2. The thermal management system of claim 1, wherein the fluid control valves are proportional control valves.

3. The thermal management system of claim 1, wherein waste heat from a drivetrain of the vehicle is collected by fluid in the drivetrain loop and used to provide heat to the battery coolant loop.

4. The thermal management system of claim 1, comprising:
   a coolant subsystem in which coolant flows through a cabin loop first heat exchanger disposed in the cabin coolant loop, a battery loop heat exchanger disposed in the battery coolant loop and a drivetrain loop first heat exchanger that is disposed in the drivetrain coolant loop; and
   a refrigerant subsystem in which refrigerant flows through a cabin loop second heat exchanger, the battery loop heat exchanger and a drivetrain loop second heat exchanger, the drivetrain loop second heat exchanger being disposed in the drivetrain loop, wherein
   a first blower moves air through the cabin loop first and second heat exchangers, and
   a second blower moves air through the drivetrain loop first and second heat exchangers.

5. The thermal management system of claim 4, wherein the coolant subsystem includes a bypass of the cabin coolant loop whereby the battery coolant loop coolant temperature can be modulated.

6. The thermal management system of claim 1, wherein waste heat from a drivetrain of the vehicle is collected by fluid in the drivetrain loop and used to provide heat to the battery coolant loop and the cabin coolant loop.

7. The thermal management system of claim 6, wherein a proportional valve is used to divert coolant from the drivetrain coolant loop to both of the battery coolant loop and the cabin coolant loop, whereby waste heat from a drivetrain of the vehicle is used to thermally manage both the passenger cabin and the traction battery.

\* \* \* \* \*